United States Patent
Momochi et al.

Patent Number: 6,075,335
Date of Patent: Jun. 13, 2000

[54] POSITIONING CONTROL METHOD, NUMERICAL CONTROL APPARATUS, NUMERICAL CONTROL PROGRAM-GENERATING APPARATUS AND RECORDING MEDIUM FOR THE POSITIONING CONTROL METHOD

[75] Inventors: Takeshi Momochi, Numazu; Masahito Shiozaki, Niigata; Michio Matsumoto, Numazu; Makoto Sagara, Mishima, all of Japan

[73] Assignee: Toshiba Kikai Kabushiki Kaisha, Tokyo, Japan

[21] Appl. No.: 09/225,323

[22] Filed: Jan. 5, 1999

[30] Foreign Application Priority Data

Jan. 6, 1998 [JP] Japan .................................. 10-000758

[51] Int. Cl.[7] .............................. G06F 9/06; G05B 19/19
[52] U.S. Cl. .......................... 318/571; 318/570; 318/569; 364/474.01; 364/474.22
[58] Field of Search ..................................... 318/560–696, 318/39; 364/474.01–474.32, 160–179

[56] References Cited

U.S. PATENT DOCUMENTS

| | | | |
|---|---|---|---|
| 4,250,551 | 2/1981 | Paveglio, Jr. et al. .................. | 364/474 |
| 4,387,327 | 6/1983 | Kralowetz et al. ..................... | 318/573 |
| 4,509,126 | 4/1985 | Olig et al. .............................. | 364/474 |
| 4,627,003 | 12/1986 | Kishi et al. ............................ | 364/520 |
| 4,663,705 | 5/1987 | Kishi et al. ............................ | 364/191 |
| 4,697,249 | 9/1987 | Kishi et al. ............................ | 364/900 |
| 5,914,876 | 6/1999 | Hirai ...................................... | 364/192 |
| 5,930,141 | 7/1999 | Kamiyam et al. ................. | 364/474.01 |

*Primary Examiner*—Paul Ip
*Attorney, Agent, or Firm*—Pillsbury Madison & Sutro LLP

[57] ABSTRACT

A positioning control method (80) has a setting section (81) for setting a comparison reference value in accordance with a machine tool in advance, a detecting section (82) for detecting a command value by the rapid traverse command G00, a comparing section (83) for comparing the comparison reference value and the command value, and a determining section (84) for changing the rapid traverse command G00 to a linear interpolation command G01 when the command value is smaller than the comparison reference value, executing the rapid traverse value G00 when the command value is larger than the comparison reference value, and selecting either one of the rapid traverse command G00 or the linear interpolation command G01 when the comparison reference value is equal to the command value. Less effective short-distance rapid traverse command is converted to the linear interpolation command, thus speeding up positioning control to make an entire processing of the workpiece faster.

11 Claims, 6 Drawing Sheets

POSITIONING CONTROL METHOD, NUMERICAL CONTROL APPARATUS, NUMERICAL CONTROL PROGRAM-GENERATING APPARATUS AND RECORDING MEDIUM FOR THE POSITIONING CONTROL METHOD

BACKGROUND OF THE INVENTION

1. Field of the Invention

The present invention relates to a positioning control method for positioning a workpiece and a tool of a machine tool. The positioning control method has a rapid traverse command for moving the tool and/or the workpiece to a predetermined position at a maximum speed and a linear interpolation command for moving the tool and/or the workpiece while conducting linear interpolation. The present invention also relates to a numerical control apparatus for conducting the positioning control method, a numerical control program-generating apparatus for enabling the positioning control method and a computer-readable recording medium for recording a program for conducting the positioning control method.

2. Description of Related Art

Conventionally, a rapid traverse command is input to a numerical control apparatus (referred to "NC apparatus" hereinafter) to determine a relative position of a workpiece and a tool in a processing method of the workpiece by controlling a machine tool by the NC apparatus. The rapid traverse command relatively moves either the workpiece or the tool at a maximum speed, and thus, rapidly positions the workpiece and the tool for accelerating processing work. In Japan, a basic command code of the NC apparatus is defined in JIS-B-6314. The rapid traverse command is defined to be a sequence of command following a "G00" code.

Figure 6:
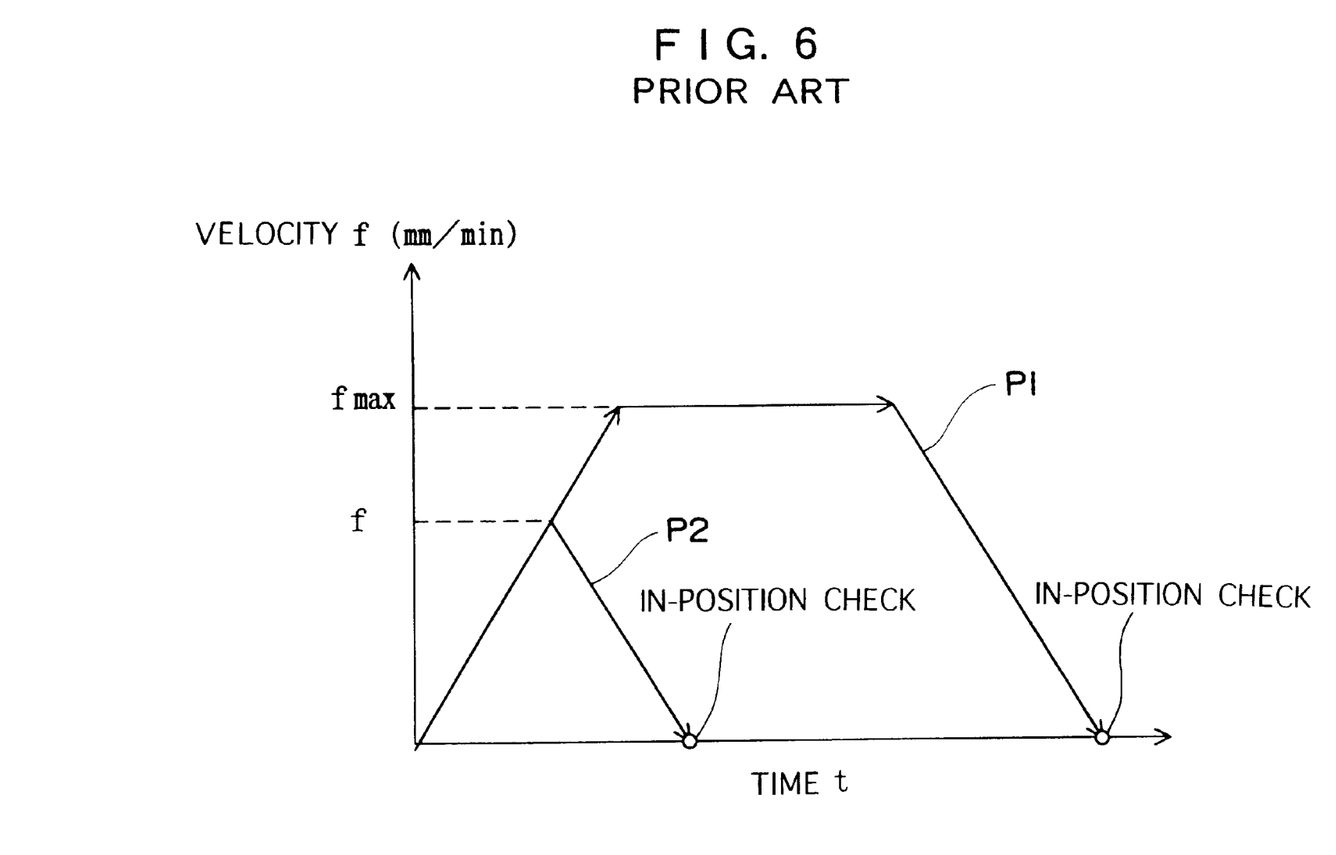
FIG. 6 is a graph showing a movement velocity change by a rapid traverse command according to a conventional art.

In positioning control, a final relative position of the workpiece and the tool is of greater importance than the method of reaching the position. Accordingly, when the rapid traverse command is inputted to the NC apparatus adding a target position of the tool, the tool is accelerated gradually to move at the maximum speed and is decelerated as it approaches the target position, as shown in acceleration-deceleration process P1 of FIG. 6.

If a command of "G00X100Y200" (move the tool to X=100 mm and Y=200 mm at a rapid traverse) is sent in a multi-axis positioning control, the X-axis, Y-axis and Z-axis position are independently controlled. And an in-position check which compares the target position and the tool's actual position is conducted after completing the position shift.

However, the positioning control by the rapid traverse command includes an acceleration-deceleration process from a standstill to the maximum speed or a reverse thereto. Accordingly, when the tool moves short as shown in P2 of FIG. 6, the tool and the like enters the deceleration process before reaching the maximum speed, and the workpiece is not positioned by sufficient high-speed.

Furthermore, the in-position check is conducted after stopping the tool according to the positioning control of the rapid traverse command as described above. Accordingly, extra time for the check is necessary, requiring longer time when the movement distance is short, so that the workpiece is not positioned by sufficient high-speed.

As described above, the movement speed of the tool and the like does not reach the maximum and in-position check is necessary at every stop point when a sequence of the rapid traverse command is employed for moving the tool and the like at a relatively short distance. Accordingly, there is a limit in speeding up an entire processing of the workpiece including the positioning control of the tool and the like.

SUMMARY OF THE INVENTION

An object of the present invention is to provide a positioning control method for speeding up a processing of the workpiece, a numerical control apparatus, numerical program-generating apparatus and a recording medium for conducting the positioning control method.

A positioning control method for determining a position of a workpiece and a tool of a machine tool, according to first aspect of the present invention, uses a rapid traverse command for moving the tool and/or the workpiece to a predetermined position at a maximum speed and a linear interpolation command for moving the tool and/or the workpiece while linearly interpolating. The positioning control method includes setting a comparison reference value in accordance with the machine tool, detecting a command value of a rapid traverse by the rapid traverse command, comparing the comparison reference value and the command value, and determining whether the rapid traverse command and the linear interpolation command should be executed. In the determining step, the linear interpolation command is executed when the comparison reference value is smaller than the command value, the rapid traverse command is executed when the command value is larger than the comparison reference value, and either the rapid traverse command or the linear interpolation command is executed when the comparison reference value and the command value are equal.

The above linear interpolation command is one of basic control commands of a NC apparatus, which is defined in the JIS-B-6314 as a sequence of command following a "G01" code. Specifically, the linear interpolation command is executed by setting a target position (such as X100Y200) and a velocity (such as F20) after the G01 code. When the NC apparatus receives the linear interpolation command, the NC apparatus checks a tool locus designated by the data after the G01 code and an actual processing locus, so that the tool is moved linearly while maintaining an accurate position in a movement path to keep divergence of these locus within a predetermined allowance.

The comparison reference value set by the above setting step is determined based on the following idea.

Figure 1:
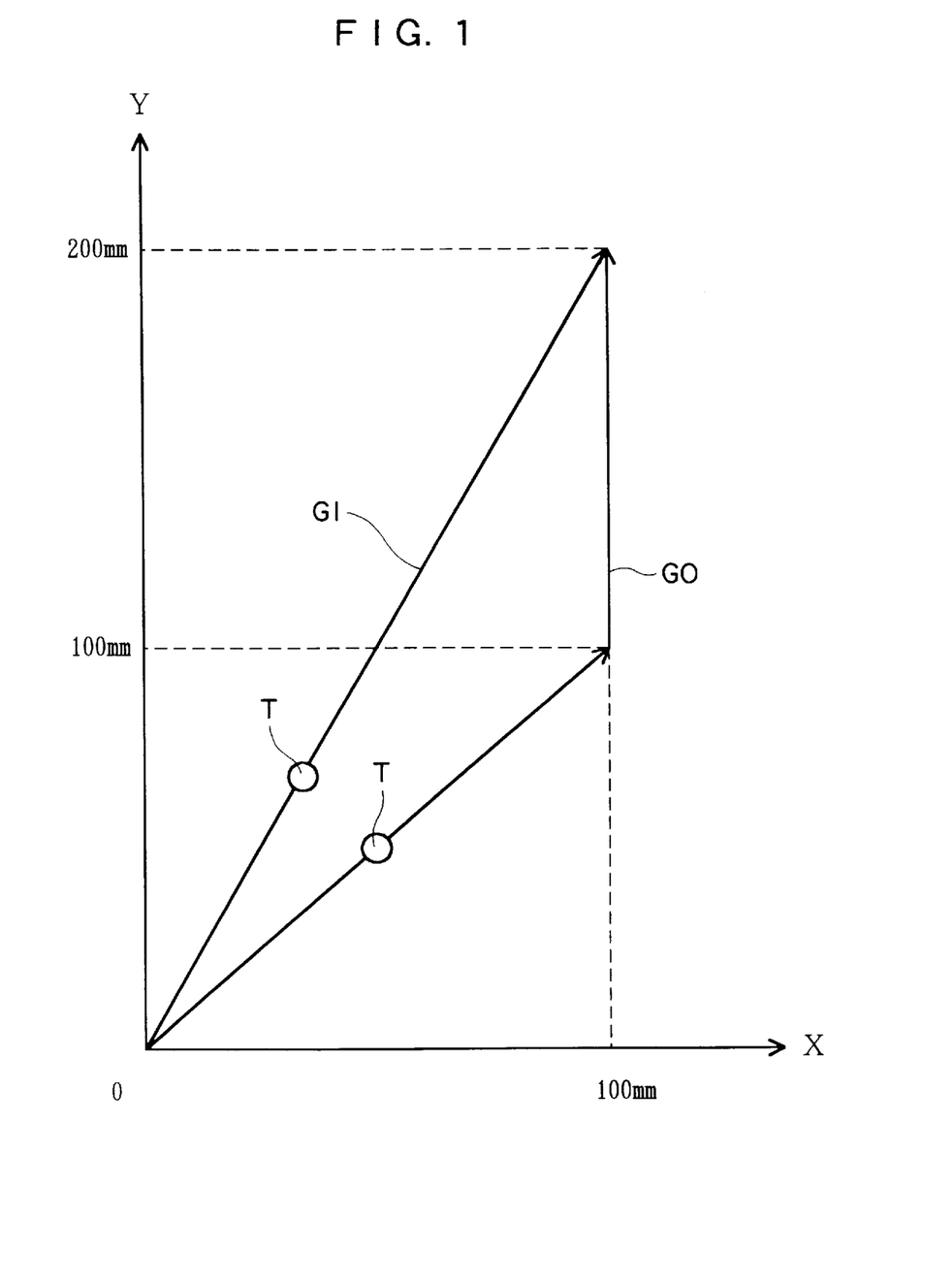
FIG. 1 is a top plan view showing a movement locus of a tool for explaining an effect of the present invention.

In the instant case, the tool T is moved by 100 mm in a X-axis direction and by 200 mm in a Y-axis direction to be positioned.

According to a movement by the rapid traverse command (G00 code), as shown in FIG. 1, the tool T is moved along either a path G0 or a path G1 at a maximum feed speed the respective X-axis driving mechanism and Y-axis driving mechanism. When the tool T reaches a position defined by the coordinates X=100 and Y=200, the in-position check is conducted.

According to a movement by the linear interpolation command (G01 code), the tool T is moved along the path G1 at a preset velocity (e.g. F=20) while linearly interpolating. Incidentally, since the tool T moves while linearly interpolating, the in-position check after reaching the target position is not conducted.

Which one of the rapid traverse command and the linear interpolation command can move the tool T faster can be determined by predicting a movement time (including in-position checking time for the rapid traverse command) according to the respective commands.

Specifically, the comparison reference value can be set based upon the machine tool to be position-controlled, considering a relationship between a movable range of the respective axis-driving mechanisms and moving amount of the tool set as a parameter, maximum feed speed of the respective axis-driving mechanisms, time before reaching the maximum speed and parameter setting of the linear interpolation command etc. The determined comparison reference value is preferably recorded in the NC apparatus and the like for controlling the machine tool.

The above command value detected by the detecting step is moving the respective axis designated by the rapid traverse command. For example, the command value is 100 for the X-axis and 200 for the Y-axis in a rapid traverse command of G00X100Y200.

When the comparison reference value and the command value are equal, either the rapid traverse command and the linear interpolation command may be selected because the necessary time is equal, i.e. the same effect can be obtained by selecting either of the commands. A means for designating either one of the commands to be selected may be a program according to the present invention, or alternatively, reference to a memory area set with the designation from outside.

According to the first aspect of the present invention, on account of the above determining step, the tool can be moved at a predetermined constant speed by changing the rapid traverse command (G00) to the linear interpolation command (G01) when the command value detected by the detecting step is smaller than the comparison reference value. In other words, when the tool can not be moved at a maximum speed by the rapid traverse command (G00), the linear interpolation command may be used.

Accordingly, a time loss for accelerating and decelerating the tool can be prevented, thus rapidly conducting the positioning control to speed up the processing of the workpiece. Further, since the tool is moved by the linear interpolation command (G01) while the divergence between the targeted tool locus and the actual tool locus is kept within a predetermined allowance, the in-position check is not necessary after the tool reaches the target position, thereby further speeding up the positioning control.

In the above arrangement, the positioning control method preferably further comprises selecting whether the setting step, the detecting step, the comparing step and the determining step are started or stopped.

By providing the selecting step, an automatic convert of the rapid traverse command and the linear interpolation command according to the above-described positioning control method can be conducted as necessary. Accordingly, its operation NC apparatus can be used more flexibly by simplifying the The positioning control method is applied preferably to a machine tool that uses a spindle as a rotation axis of the tool or the workpiece that is supported by an air bearing.

Speeding up the processing of the workpiece for a machine tool which uses the as the rotation axis of the tool or the workpiece that is supported by the air bearing, is highly effective.

Further, for attaining the aforesaid object, a positioning control method for determining a position of a workpiece and a tool of a machine tool according to second aspect of the present invention uses a rapid traverse command for moving the tool and/or the workpiece to a predetermined position at a maximum speed and a linear interpolation command for moving the tool and/or the workpiece while linearly interpolating. The positioning control method detects a command value of a rapid traverse by the rapid traverse command, predicts a movement time according to the rapid traverse command and the linear interpolation command based on the command value and determines whether to execute the rapid traverse command or the linear interpolation command by comparing the movement times.

When predicting the movement time according to the rapid traverse command and the linear interpolation command, a relationship between a movable range of the respective axis-driving mechanisms and the tool, a maximum feed speed of the respective axis-driving mechanisms, a time before reaching the maximum speed and parameter setting of the linear interpolation command etc. are considered.

Selection of either the rapid traverse command or the linear interpolation command, is based upon which has the shorter movement time.

According to the second aspect of the present invention, because of the predicting step, the positioning control can be conducted at a high speed as in the first aspect of the present invention. And since the comparison reference value is not set necessarily as compared with the first aspect of the present invention, the positioning control method can be conducted simply.

A numerical control apparatus according to the present invention is for conducting either one of the above-described positioning control method, which has a processing program input area for inputting a processing program for controlling a workpiece and a tool, a processing program processor for reading the processing program inputted from the processing program input area to output a control signal, and an execution processor for executing either one of the positioning control methods in accordance with the processing program.

According to the NC apparatus, either one of the positioning control methods is applied in accordance with the G00 code of the inputted processing program to conduct rapid traverse.

A NC program-generating apparatus according to the present invention enables the execution of either one of the positioning control methods, which has a processing program processor for generating and editing the processing program to control the workpiece and the tool, and an incorporation processor for executably incorporating either one of the positioning control methods to the processing program generated by the processing program processor.

The NC program-generating apparatus can be a computer installed with an APT (Automatic Programming Tool) system for automatically generating the processing program, a computer installed with a CAD/CAM system having a converting function of a drawing data on a screen to a processing program and the like. Alternatively, a NC apparatus installed with a CAD system and having processing program generating function can also be adopted.

According to the NC program-generating apparatus, because either one of the positioning control methods is incorperated executably into the processing program by the incorporation processor. The above-described positioning control method can be conducted by the NC apparatus irrespective of the setting of the NC apparatus for the processing program to be input, thereby largely improving its applicability.

A recording medium according to the present invention has a program for executing either one of the positioning control methods recorded thereon.

The recording medium refers to a recording medium readable by a NC apparatus and NC program-generating apparatus such as a computer, which includes so-called NC tape having an information hole formed on a paper tape, a magnetic recording medium such as a hard disk and a floppy disk, an optical recording medium such as a CD-ROM and a CD-R (Compact Disk Recordable), flash memory and the like.

Information for managing program groups such as a version information and a programmer name, an information depending on an OS (Operating System) of a program reading side such as Icon for distinguishably displaying the program on the OS, can be recorded on the recording medium as well as the main program for executing the above-described positioning control method. Further, a program for installing various programs including the program for executing the positioning control method to the computer, and a program for decompressing the installing program can be recorded on the recording medium.

According to the recording medium, the program can be installed to various NC apparatuses through the recording medium, thereby improving applicability of the above-described program. When the recording medium includes the OS information, the installing program, the decompressing program and so on, the installing step can be facilitated, thereby further improving applicability of the program.

DETAILED DESCRIPTION OF PREFERRED EMBODIMENT(S)

A preferred embodiment of the present invention will be described below with reference to drawings.

Figure 2:
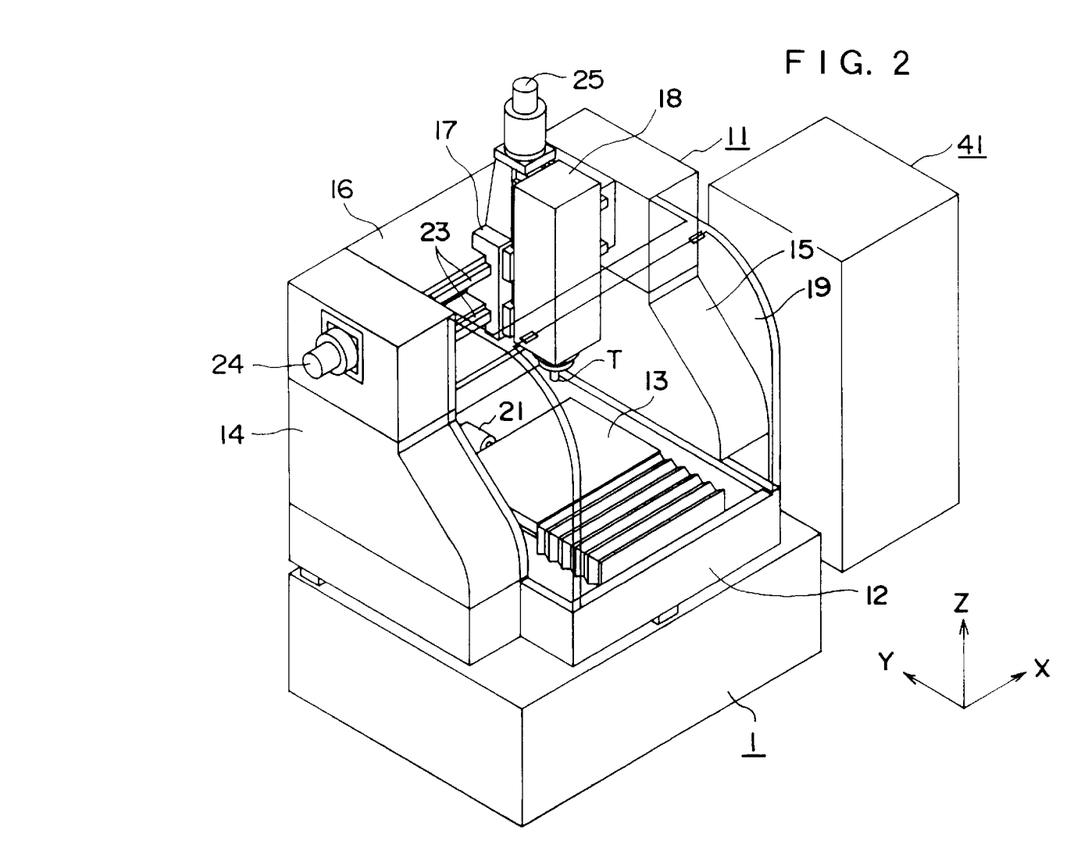
FIG. 2 is a perspective view showing a machine tool according to a preferred embodiment of the present invention.

FIG. 2 is a perspective view showing a machine tool to which a positioning control method according to the present invention is applied. As shown in the FIG. 2, the machine tool is controlled by a NC apparatus 41 and has a base 1, a machine body 11 mounted on the base 1. The NC apparatus 41 is a control means for controlling the drive of the machine body 11.

The machine body 11 is composed of a bed 12 mounted on the upper side of the base 1 through a leveler or the like, a table 13 provided on an upper side of the bed 12 movably in back and forth direction (Y-axis direction), a pair of column 14 and 15 erectly set on both side of the bed 12, a cross rail 16 stretched between upper portions of the columns 14 and 15, a slider 17 provided along the cross rail 16 movably in right and left direction (X-axis direction), a spindle head 18 provided to the slider 17 elevatably in up and down direction (Z-axis direction), and a splash guard 19 which covers a front part between the column 14 and 15, of which inside is visible and which can be opened and closed in up and down direction with the upper end thereof as a fulcrum.

The bed 12 has a Y-axis driving mechanism 21 which moves the table 13 in Y-axis direction accompanied by a guide (not shown) for guiding the table 13. A feed screw mechanism consisting of a motor and a feed screw shaft rotated by the motor is employed as the Y-axis driving mechanism 21.

The side shape of the respective columns 14 and 15 is configured approximately triangle having wider bottom portion than upper portion.

Accordingly, the bottom portion is stable enough to decrease generating a vibration even when a high-speed rotating spindle head 18 is used.

The cross rail 16 has two guide rail, 23 for movably guiding the slider 17 as well as X-axis driving mechanism 24 for moving the slider 17 in X-axis direction.

The slider 17 has a guide (not shown) for guiding the spindle head 18 in Z-axis direction as well as a Z-axis driving mechanism 25 for elevating the spindle head 18 in Z-axis direction. As in the Y-axis driving mechanism 21, the driving mechanisms 24 and 25 also employ a feed screw mechanism composed of a motor and a feed screw shaft rotated by the motor.

Figure 3:
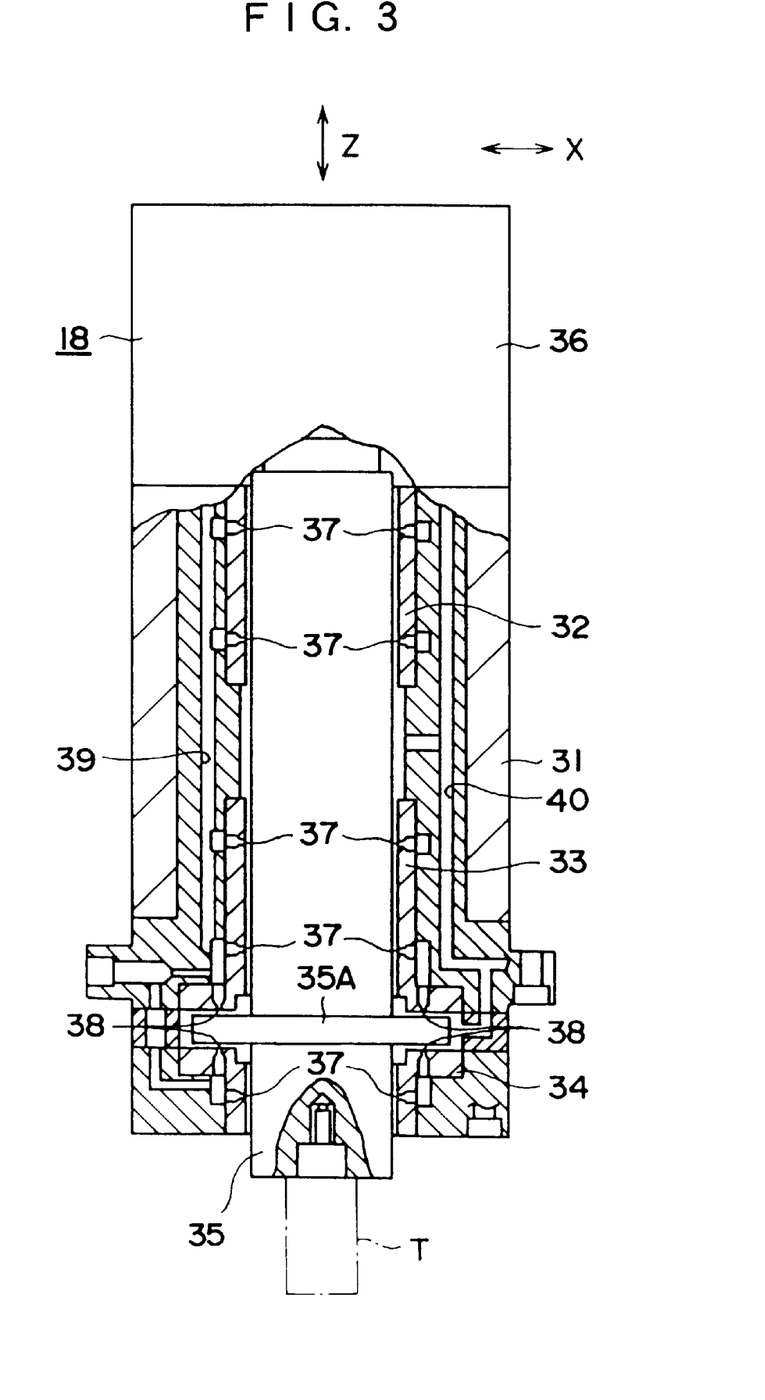
FIG. 3 is a cross sectional view showing a spindle head according to the preferred embodiment.

As shown in FIG. 3, the spindle head 18 is composed of an air-bearing supported spindle head. More specifically, the spindle head 18 is composed of an air-bearing supported spindle head having a housing 31 elevatably provided to the cross rail 16 elevated by the Z-axis driving mechanism 25, a spindle 35 supported in parallel to Z-axis direction to the housing 31 rotatably through the air-bearings 32, 33 and 34 and having a fringe 35A in the halfway thereof, and a motor 36 for rotatively driving the spindle 35. The spindle 35 can be rotated at a high-speed of 30,000 to 50,000 rpm.

A plurality of air-blowing holes 37 which blow air toward the spindle 35 in a direction perpendicular to the axis of the spindle are formed on an inner side of the respective air-bearings 32, 33 and 34. The air blown by the air-blowing holes 37 forms a radial bearing for supporting the spindle 35 in a radial direction. Another plurality of air-blowing holes 38 which blow air toward the fringe 35A of the spindle 35 are formed on an end side of the respective air-bearings 33 and 34 respectively opposing in axis-direction. The air blown by the air-blowing holes 38 forms a thrust bearing for supporting the spindle 35 in a thrust direction. Incidentally, in FIG. 2, 39 represents an air-supply passage for providing air to the respective air-blowing holes 37 and 38, 40 show an air-outlet passage and T is a rotary tool such as an end mill.

Figure 4:
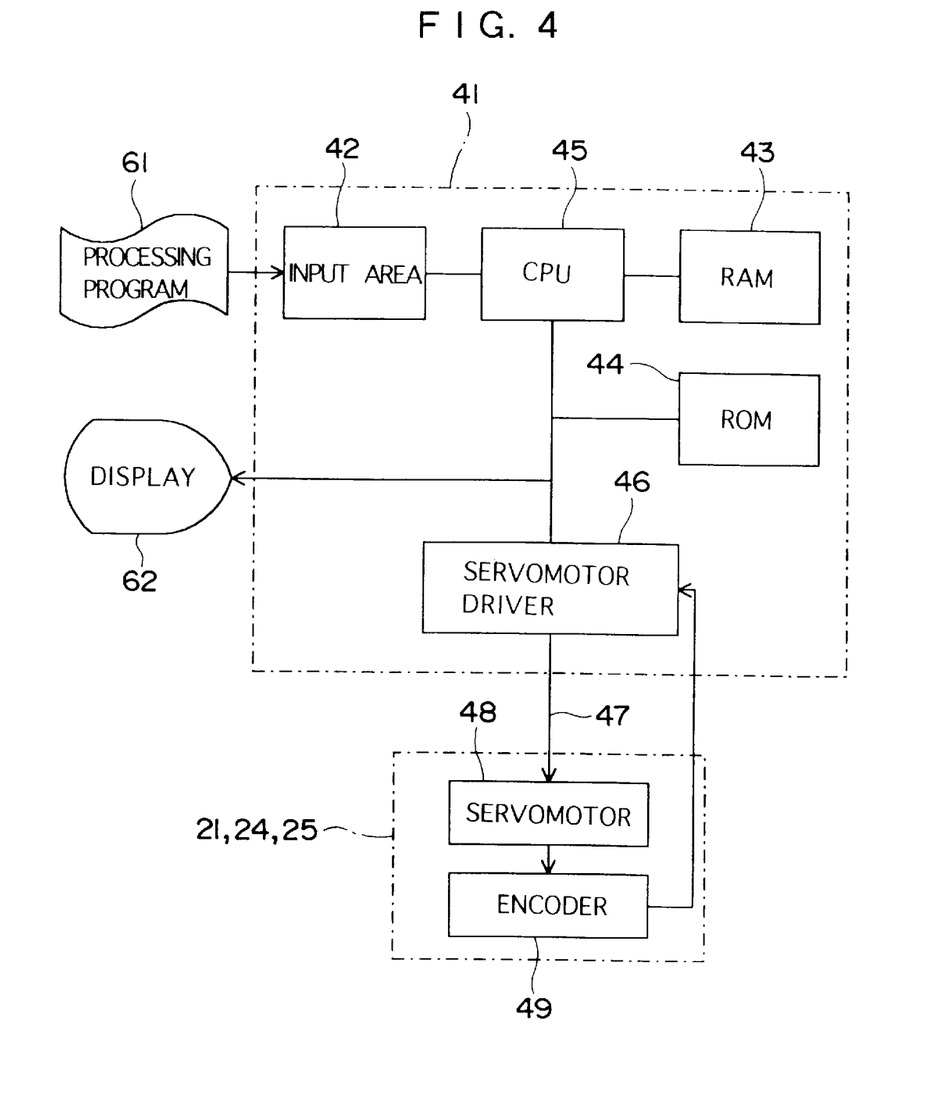
FIG. 4 is a block diagram showing a structure of a NC apparatus according to the preferred embodiment.

As shown in FIG. 4, the NC apparatus has an input area 42, a RAM 43, a ROM 44, a CPU 45 and a servomotor driver 46.

The input area 42 has a NC tape reader, a keyboard, a network communication means and the like. A processing program 61 is input from the input area 42.

The RAM 43 is a memory area in which the processing program 61 and parameters for controlling various NC apparatuses are stored. Incidentally, electric power is supplied to the RAM 43 by a battery or the like as well as by a power source of the entire NC apparatus 41, thereby preventing stored data from being lost by a power cut of the NC apparatus 41.

The ROM 44 is a memory area in which a control code of the NC apparatus 41 is stored. Specifically, control codes such as a preparation function word (G code) including a rapid traverse command (G00 code) and a linear interpolation command (G01 code), a tool function word (T code) and a miscellaneous function word (M code) for commanding a specific action to the machine tool are stored in the ROM 44.

The CPU 45 uses the control code in the ROM 44, stores data necessary to be temporarily stored in an area of the RAM 43 while reading out the processing program 61 stored in the RAM 43 and calculates a movement command based on the read-out processing program 61 to output to the servomotor driver 46.

The movement command output to the servomotor driver 46 is transmitted to the X-axis driving mechanism 24, the Y-axis driving mechanism 21 and the Z-axis driving mechanism 25 through a communication line 47 to actuate a servomotor 48 provided inside based on the movement command.

As shown in FIG. 4, an encoder 49 for checking the actual movement locus by the servomotor 48 is provided to the X-axis driving mechanism 24, the Y-axis driving mechanism 21 and the Z-axis driving mechanism 25. The actual movement locus of the X-axis driving mechanism 24, the Y-axis driving mechanism 21 and the Z-axis driving mechanism 25 is transmitted to the CPU 45 through the servomotor driver 46. A divergence between the tool's locus based on the movement command and the actual movement locus is displayed on a display 62, for an operator to observe.

Figure 5:
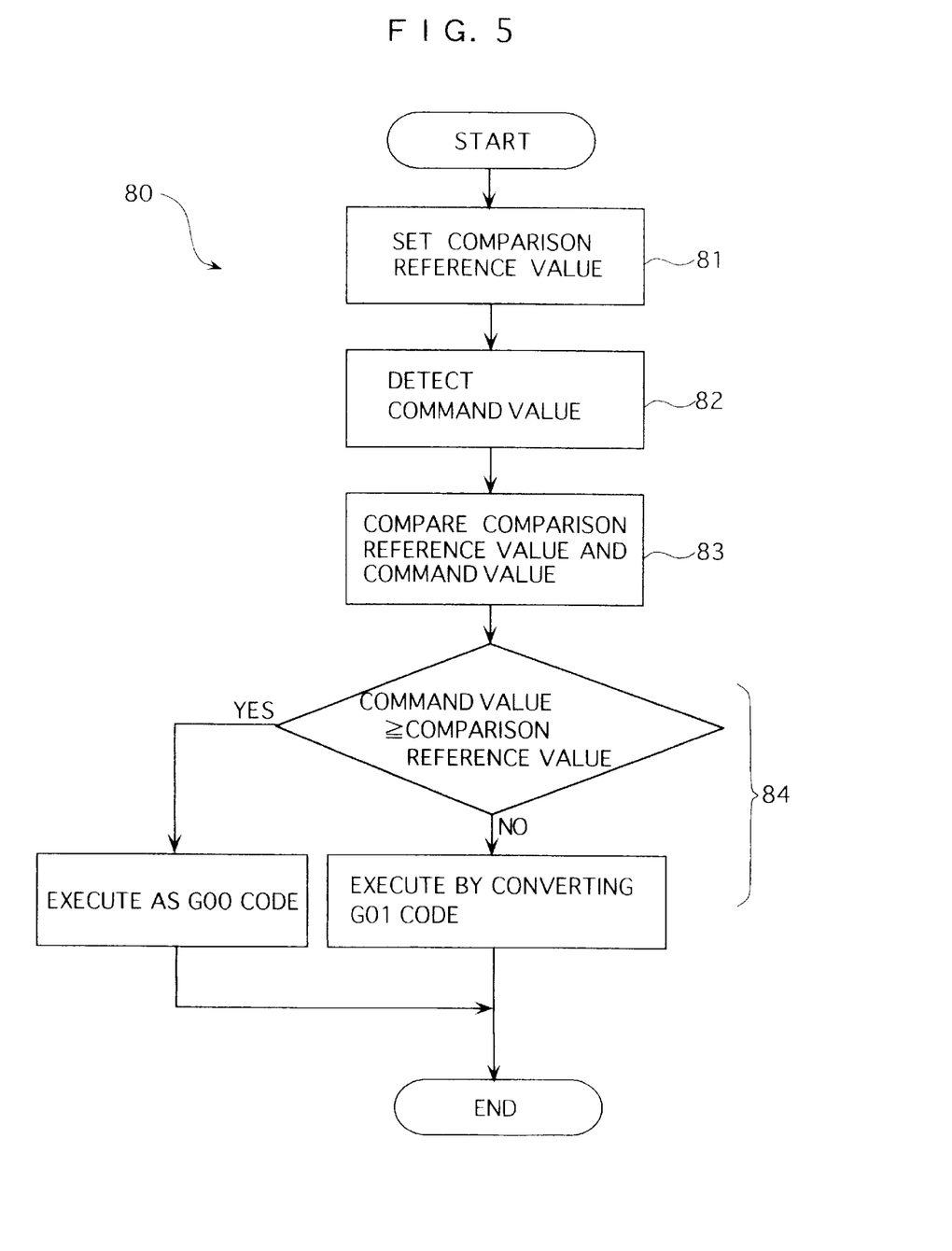
FIG. 5 is a flow chart showing a positioning control method according to the preferred embodiment.

The positioning control method according to the present embodiment is conducted in accordance with a program 80 shown in a flow chart shown in FIG. 5.

The program 80 has a setting section 81 for setting a comparison reference value, a detecting section 82 for detecting a command value, a comparing section 83 for comparing the comparison reference value and the command value and a determining section 84 for commanding a movement of the tool T based on a comparison results of the comparing section 83. Incidentally, the program 80 is stored in the ROM 44 and is called by the CPU 45 simultaneously with starting the NC apparatus 41.

Executing the program 80 in the NC apparatus 41 to drive the X-axis driving mechanism 24 and the Y-axis driving mechanism 21 of the machine body 11 will be described below.

The comparison reference value is set in advance by the setting section 81 and the set value is stored in the parameter area of the RAM 43. Incidentally, the comparison reference value is determined considering a relationship between a movable range of the respective axis-driving mechanisms 21 and 24 and moving amount of the tool T set as a parameter, maximum feed speed of the G00 code, time period before reaching the maximum speed and parameter setting of the linear interpolation command etc. In the above-described machine tool, the comparison reference value is set as 20 in both X-axis and Y-axis directions.

For instance, when the tool T is moved by 100 mm in X-axis direction and 200 mm in Y-axis direction, the processing program 61 written therein a positioning control command of G00X100Y200 is input to the input area 42 of the NC apparatus 41.

The detecting section 82 detects an X-axis direction moving amount of 100 and a Y-axis moving amount of 200 from the control code of G00X100Y200 as the command value.

The comparing section 83 compares the comparison reference value of 20 and the command value of 100 and 200.

According to the comparison result by the comparing section 83, the determining section 84 determines which one of the rapid traverse command (G00) and the linear interpolation command (G01) should be used to move the tool T. In the present case, since the comparison reference value is smaller both in the X-axis direction and the Y-axis direction, it is known that the tool T should be moved by the rapid traverse command (G00). Accordingly, the tool T is moved according to the G00 code along the movement locus G0 or G01 shown in FIG. 1 to a position of X=100 mm and Y=200 mm and an in-position check is conducted to confirm whether the divergence between the position of the tool T and the input coordinate is within a predetermined range.

On the other hand, when the tool T is moved 10 mm in X-axis direction and 19 mm in Y-axis direction, the processing program 61 is similarly input to the input area 42 with a positioning control command of G00X10Y19.

The comparison reference value and the command value is similarly compared by the detecting section 82, and the comparing section 83 and the determining section 84 determines whether the G00 code should be executed or the G01 code should be executed instead of the G00 code. In the present case, since X10 and Y19 are smaller than the comparison reference value of 20, the G01 code is used for determining positioning control. Accordingly, the tool T is moved to the target position of X10 Y19 along the movement locus G1 of FIG. 1 while interpolating linearly.

According to the present embodiment, following effects can be observed.

Since the present embodiment has the determining section 84 for determining which one of G00 code or G01 code should be selected for controlling position according to a level of the command value relative to the comparison reference value, the positioning control can be conducted at a high-speed, so that the entire processing of the workpiece including the positioning control can be made faster.

When the command value is smaller than the comparison reference value, since the positioning control is conducted by the G01 code, which does not require the in-position check, the positioning control can be made further faster. Especially, when a short distant movement such as G00X10Y19 is conducted in succession, the positioning control method according to the present embodiment in which the in-position check can be omitted is highly effective.

Since the comparison reference value can be set in a variety of values by the setting section 81 executing the setting step, a proper comparison reference value can be set in accordance with the specification of the machine tool and the like, so that the program 80 can be highly extensively applied.

Since the spindle 35 is supported by the air-bearings 32, 33 and 34 to enable high-speed processing of the machine tool, the positioning control method according to the present invention can be effectively applied.

Incidentally, the present invention is not limited to the above-described embodiment, but includes following modifications.

According to the above-described embodiment, the program 80 is called by the CPU 45 simultaneously with the start of the NC apparatus 41 and the program 80 is automatically executed simultaneously with an input of the G00 code. However, a selecting step for starting or stopping the sequence from the setting step to determining step may be provided before the setting section 81 shown in FIG. 5.

In this case, an indicating code for determining whether the program 80 is executed or not can be set in advance to an unset area such as G70s of the area for storing the control code such as G function and M function. Alternatively, a reference value (a value which is determined inherently to the apparatus and is different from the above-described comparison reference value) may be set in advance in the RAM 43 and ROM 44 of the NC apparatus 41 to determine whether the program 80 should be executed or not.

With the selecting step, the positioning control method according to the present invention can be conducted selectively in the NC apparatus. Accordingly, the NC apparatus can be flexibly used by simplifying the process in the NC apparatus when no automatic convert of the positioning control is necessary.

According to the positioning control method in the above-described embodiment, the comparison reference value is set by the setting step and is compared with the command value detected by the detecting step to determine which one of the G00 code and the G01 code should be selected.

However, the positioning control method for attaining the object of the present invention is not limited to the above arrangement, but the setting step may be omitted. Alternatively, the positioning control method according to the present invention may have a predicting step for predicting a movement time by the G00 and G01 code, and a determining step for selecting and executing either one of the codes by comparing the predicted movement time.

According to the above arrangement, the predicting step allows a high-speed positioning control similarly to the above-described embodiment, and there is no need for the operator to set the comparison reference value. Therefore, execution of the positioning control method can be simplified.

According to the above-described embodiment, the program 80 for executing the positioning control method is recorded in the NC apparatus 41 and is performed. However, the scope of the present invention is not limited to this arrangement.

In other words, an effect similar to the above-described embodiment can be obtained by providing an incorporation processor for incorporating the positioning control method according to the present invention to a processing program generated by a NC program-generating apparatus installed with APT (Automatic Programming Tool) system and CAD system for generating the processing program. Since the positioning control method according to the present invention can be executed irrespective of setting of the NC apparatus, usability of the positioning control method can be improved.

Though the program 80 according to the above-described embodiment is stored in the ROM 44 area of the NC apparatus 41, the effect similar to the above-described embodiment can also be obtained by applying the present invention to a NC apparatus of which RAM 43 has therein the program 80.

The program for conducting the positioning control method according to the present invention is preferably recorded to a magnetic recording medium such as a floppy disk, an optical recording medium such as a CD-ROM and the like, thus enabling to be input from the input area of the NC apparatus.

By utilizing the recording medium recorded therein the program, the program can be installed to a variety of NC apparatus through the recording medium, thereby improving applicability of the program.

Though the program 80 according to the above-described embodiment controls the action of the NC apparatus 41 itself having the program 80 installed thereon, the scope of the present invention is not restricted to the arrangement.

The program may be installed by an outside terminal on a computer network and actual control may be executed by a host computer on the computer network. Alternatively, an information group including the program may be distributed to an output apparatus from an external recording medium through the computer network. According to the above arrangement, the present invention can be applied to obtain similar effect as in the above-described embodiment.

The positioning control method according to the present invention can be applied to a system composed of a plurality of machines unlike the apparatus of the above-described embodiment composed of a single machine. In this case, the effect of the present invention can be applied to the system by reading out the recording medium storing the program represented by a software for attaining the present invention.

More specifically, by downloading the program from a database on a computer network by a communications program, the effect of the present invention can be received by the system. Incidentally, the program can be read out also by an apparatus composed of a single machine.

Any other specific structures and configurations can be adopted as long as the object of the present invention can be attained.

What is claimed is:

1. A positioning control method for determining a position of a workpiece and a tool of a machine tool using rapid traverse command for moving the tool and/or the workpiece to a predetermined position at a maximum speed and linear interpolation command for moving the tool and/or the workpiece while linearly interpolating, comprising the steps of:

setting a comparison reference value according to a moveable range of the machine tool;

detecting a command value of a rapid traverse by the rapid traverse command;

comparing the comparison reference value and the command value;

determining which one of the rapid traverse command and the linear interpolation command should be executed, wherein the rapid traverse command is executed when the command value is larger than the comparison reference value, the linear interpolation command is executed when the command value is smaller than the comparison reference value and either the rapid traverse command or the linear interpolation command is executed when the command value is equal to the comparison reference value.

2. The positioning control method according to claim 1, further comprising the step of selecting whether the setting step, the detecting step, the comparing step and the determining step are started or stopped.

3. The positioning control method according to claim 1, wherein a spindle of the machine tool as a rotation axis of the tool or the workpiece is supported by an air-bearing.

4. A positioning control method for determining a position of a workpiece and a tool of a machine tool using rapid traverse command for moving the tool and/or the workpiece to a predetermined position at a maximum speed and linear interpolation command for moving the tool and/or the workpiece while linearly interpolating, comprising the steps of:

detecting a command value of a rapid traverse by the rapid traverse command;

predicting a first movement time according to the rapid traverse command based on the command value;

predicting a second movement time according to the linear interpolation command based on the command value;

determining whether to execute the rapid traverse command or the linear interpolation command by comparing the first movement time and the second movement time; and executing either the rapid traverse command or the linear interpolation command based upon the comparison of the first movement time and the second movement time.

5. The positioning control method according to claim 2, wherein a spindle of the machine tool as a rotation axis of the tool or the workpiece is supported by an air-bearing.

6. A numerical control apparatus for determining a position of a workpiece and a tool of a machine tool using rapid traverse command for moving the tool and/or the workpiece to a predetermined position at a maximum speed and linear interpolation command for moving the tool and/or the workpiece while linearly interpolating, comprising:

means for setting a comparison reference value according to a moveable range of the machine tool;

means for detecting a command value of a rapid traverse by the rapid traverse command;

means for comparing the comparison reference value and the command value;

means for determining which one of the rapid traverse command and the linear interpolation command should be executed, wherein the rapid traverse command is executed when the command value is larger than the comparison reference value, the linear interpolation command is executed when the command value is smaller than the comparison reference value and either the rapid traverse command or the linear interpolation command is executed, as predetermined, when the command value is equal to the comparison reference value;

a processing program input area for inputting a processing program for controlling the workpiece and the tool;

a processing program processor for reading the processing program inputted by the processing program input area to output a control signal; and an execution processor for executing a positioning control method in accordance with the processing program.

7. A numerical control apparatus for determining a position of a workpiece and a tool of a machine tool using rapid traverse command for moving the tool and/or the workpiece to a predetermined position at a maximum speed and linear interpolation command for moving the tool and/or the workpiece while linearly interpolating, comprising:

means for detecting a command value of a rapid traverse by the rapid traverse command;

means for predicting a first movement time according to the rapid traverse command based on the command value;

means for predicting a second movement time according to the linear interpolation command based on the command value;

means for determining whether to execute the rapid traverse command or the linear interpolation command based on a comparison of the first movement time and the second movement time;

means for executing either the rapid traverse command or the linear interpolation command based on the comparison of the first movement time and the second movement time;

a processing program input area for inputting a processing program for controlling the workpiece and the tool;

a processing program processor for reading the processing program inputted by the processing program input area to output a control signal; and an execution processor for executing a positioning control method in accordance with the processing program.

8. A NC program-generating apparatus for determining a position of a workpiece and a tool of a machine tool using rapid traverse command for moving the tool and/or the workpiece to a predetermined position at a maximum speed and linear interpolation command for moving the tool and/or the workpiece while linearly interpolating, comprising:

means for setting a comparison reference value according to a moveable range of the machine tool;

means for detecting a command value of a rapid traverse by the rapid traverse command;

means for comparing the comparison reference value and the command value;

means determining which one of the rapid traverse command and the linear interpolation command should be executed, wherein the rapid traverse command is executed when the command value is larger than the comparison reference value, the linear interpolation command is executed when the command value is smaller than the comparison reference value and either the rapid traverse command or the linear interpolation command is executed, as predetermined, when the command value is equal to the comparison reference value;

a processing program processor for generating and editing the processing program to control the workpiece and the tool; and an incorporation processor for executably incorporating a position control method to the processing program generated by the processing program processor.

9. A NC program-generating apparatus for determining a position of a workpiece and a tool of a machine tool using rapid traverse command for moving the tool and/or the workpiece to a predetermined position at a maximum speed and linear interpolation command for moving the tool and/or the workpiece while linearly interpolating, comprising:

means for detecting a command value of a rapid traverse by the rapid traverse command;

means for predicting a first movement time according to the rapid traverse command based on the command value;

means for predicting a second movement time according to the linear interpolation command based upon the command value;

means for determining whether to execute the rapid traverse command or the linear interpolation command based upon a comparison of the first movement time and the second movement time;

means for executing either the rapid traverse command or the linear interpolation command based upon the comparison of the first movement time and the second movement time;

a processing program processor for generating and editing the processing program to control the workpiece and the tool; and an incorporation processor for executably incorporating a position control method to the processing program generated by the processing program processor.

10. A computer-readable recording medium readable by a machine, tangibly embodying a program of instructions executable by the machine to perform a method for determining a position of a workpiece and a tool of a machine tool, said method comprising:

setting a comparison reference value according to a moveable range of the machine tool;

detecting a command value of a rapid traverse by a rapid traverse command, said rapid traverse command being used for moving the tool and/or the workpiece to a predetermined position at a maximum speed;

comparing the comparison reference value and the command value; and determining which one of the rapid traverse command and a linear interpolation command should be executed, said linear interpolation command being used for moving the tool and/or the workpiece while linearly interpolating.

11. A computer-readable recording medium readable by a machine, tangibly embodying a program of instructions executable by the machine to perform a method for determining a position of a workpiece and a tool of a machine tool, said method comprising:

detecting a command value of a rapid traverse by a rapid traverse command, said rapid traverse command being used for moving the tool and/or the workpiece to a predetermined position at a maximum speed;

predicting a first movement time according to the rapid traverse command based on the command value;

predicting a second movement time according to the linear interpolation command based on the command value, said linear interpolation command being used for moving the tool and/or the workpiece while linearly interpolating;

determining whether to execute the rapid traverse command or the linear interpolation command based upon a comparison of the first movement time and the second movement time; and executing either the rapid traverse command or the linear interpolation command based upon a comparison of the first movement time and the second movement time.

\* \* \* \* \*